United States Patent
Fudala

(10) Patent No.: US 8,417,423 B2
(45) Date of Patent: Apr. 9, 2013

(54) ROBOTIC PLATFORM FOR COLLECTING DATA TO EMULATE MATERIAL HANDLING VEHICLE MAST ANGLES

(76) Inventor: David G. Fudala, Carlsbad, CA (US)

( * ) Notice: Subject to any disclaimer, the term of this patent is extended or adjusted under 35 U.S.C. 154(b) by 369 days.

(21) Appl. No.: 12/141,884

(22) Filed: Jun. 18, 2008

(65) Prior Publication Data

US 2011/0172870 A1   Jul. 14, 2011

Related U.S. Application Data

(63) Continuation-in-part of application No. 11/738,684, filed on Apr. 23, 2007, now abandoned.

(51) Int. Cl.
*G06F 7/70* (2006.01)
(52) U.S. Cl. .............. 701/50; 33/533; 414/279
(58) Field of Classification Search ............ 701/23, 701/50; 702/54; 33/533; 414/279
See application file for complete search history.

(56) References Cited

U.S. PATENT DOCUMENTS

| | | | | |
|---|---|---|---|---|
| 3,056,209 A * | 10/1962 | Oliver | | 33/523 |
| 4,403,419 A * | 9/1983 | Graves | | 33/523 |
| 4,577,494 A * | 3/1986 | Jaeggi | | 73/105 |
| 4,748,748 A * | 6/1988 | Kirven | | 33/533 |
| 4,771,549 A * | 9/1988 | Shelangoskie et al. | | 33/533 |
| 5,012,588 A * | 5/1991 | Face, III | | 33/533 |
| 5,129,803 A * | 7/1992 | Nomura et al. | | 425/62 |
| 5,253,429 A * | 10/1993 | Konno et al. | | 33/568 |
| 5,388,955 A * | 2/1995 | Schroder | | 414/279 |
| 5,535,143 A * | 7/1996 | Face | | 702/165 |
| 5,666,736 A * | 9/1997 | Wen | | 33/291 |
| 5,826,345 A * | 10/1998 | Hendricks | | 33/365 |
| 5,859,783 A * | 1/1999 | Ytterberg et al. | | 702/54 |
| 6,330,503 B1 * | 12/2001 | Sharp et al. | | 701/50 |
| 6,508,008 B2 * | 1/2003 | Suzuki et al. | | 33/521 |
| 6,568,096 B1 * | 5/2003 | Svitkin et al. | | 33/550 |
| 6,647,636 B2 * | 11/2003 | Fukuhara et al. | | 33/521 |
| 6,655,465 B2 * | 12/2003 | Carlson et al. | | 172/4.5 |
| 6,685,130 B2 * | 2/2004 | Stauber et al. | | 242/533.8 |
| 6,725,551 B1 * | 4/2004 | Sutton | | 33/286 |
| 6,782,631 B1 * | 8/2004 | Face, III | | 33/533 |
| 6,873,420 B2 * | 3/2005 | Davis et al. | | 356/601 |
| 7,159,477 B2 * | 1/2007 | Edwin et al. | | 73/865.8 |
| 2002/0007562 A1 * | 1/2002 | Kumazawa et al. | | 33/533 |
| 2003/0074801 A1 * | 4/2003 | Funke | | 33/501.02 |
| 2003/0108390 A1 * | 6/2003 | Carlson | | 404/118 |
| 2003/0233894 A1 * | 12/2003 | Tezuka et al. | | 73/865.8 |
| 2004/0256343 A1 * | 12/2004 | Maruyama | | 212/291 |
| 2005/0117973 A1 * | 6/2005 | Nelson | | 405/184.5 |
| 2005/0157842 A1 * | 7/2005 | Agrawal et al. | | 378/27 |
| 2005/0184558 A1 * | 8/2005 | Rigel | | 296/190.02 |
| 2006/0103093 A1 * | 5/2006 | Kallevig | | 280/79.11 |
| 2007/0217572 A1 * | 9/2007 | Kotowski et al. | | 378/57 |
| 2009/0072504 A1 * | 3/2009 | Kallevig | | 280/32.7 |

* cited by examiner

*Primary Examiner* — Helal A Algahaim
(74) *Attorney, Agent, or Firm* — Steven W. Webb

(57) ABSTRACT

A defined vehicle path emulator system is described, which system can be used for measuring the F-min values and profiles for a path on a concrete floor traversed by a vehicle with a specific wheelbase. The defined vehicle path emulator is an autonomous robot that guides itself down the selected path. The F-min values are used to calculate the deviations away from zero planar infinity while traversing the path for a tall mast carried by an emulated vehicle. This invention's systems are distinct from the (FF/FL) floor flatness and floor levelness measuring systems in the literature as prior art.

The floor can be marked for deviations from flatness by means of a laser etching system activated by the emulator's software system. The emulator can also signal an operator when it detects itself veering off of the defined path.

1 Claim, 3 Drawing Sheets

ROBOTIC PLATFORM FOR COLLECTING DATA TO EMULATE MATERIAL HANDLING VEHICLE MAST ANGLES

RELATED U.S. APPLICATIONS

This application is a continuation-in-part application of application Ser. No. 11/738,684, filed Apr. 23, 2007 now abandoned.

FIELD OF THE INVENTION

The present invention relates to the field of floor levelness and floor flatness measurement machines, and vehicle path emulation and measurement. More particularly, the invention relates to a self-propelled, computer-driven, autonomous apparatus to measure the floor profiles along a path taken by a vehicle for later use in leveling the surface to increase material handling efficiency and the like.

BACKGROUND

The prior art does not contain autonomous measurement devices that roll incrementally or semi-continuously; however, they must roll at a constant velocity to avoid erroneous data from unwanted accelerations and decelerations. This vehicle rolls semi-continuously and data is gathered at specific stopping points defined by a vehicle path. Furthermore, this invention performs angular chassis-mast emulation measurements exclusively in very narrow aisle warehouses (VNA's) for minimum allowable chassis-mast attitude fluctuation (F-min) with at least two separate profiles which are not indicative of the actual floor profile configuration, but which pertain to the mast sway for a given vehicle's wheelbase.

This output is significantly different from the prior art outputs listed below, which simply generate a single profile on a concrete slab—randomly placed anywhere—indicative simply of that line on the floor where it was placed for an overall average (FF/FL) number to asses—the general characteristic of an entire floor area.

There are two known manually-operated, rolling, floor-flatness and floor-levelness (FF/FL) measurement devices in the literature, including U.S. Pat. No. 6,782,631 to Face, et al. and U.S. Pat. No. 5,859,783 to Ytterberg, et al. These devices are used to make measurements of randomly-selected lines approximately 1/16th-inch to 4-inches wide, respectively across an entire concrete slab to accomplish the FF/FL measurements of an entire area, not a specific wheel path. As will be shown, the prior art in the (FF/FL) measurement category is not a direct antecedent to the present invention for at least three reasons.

The (FF/FL) machines in the prior art are not automated and self-directed, as is the present invention. The (FF/FL) measurement is distinctly different from the mathematics used by the present invention, which measures a quantity called (F-min) over a strictly-defined wheel path. The data itself is collected in a completely different manner; for, (FF/FL) devices must collect a single line of data to produce a two dimensional profile; whereas, (F-Min) is emulating the wheel base/mast correlation of a vehicle which has at least two profiles describing its side-to-side and front-to-back movements.

An automated, self-propelled machine to make defined floor wheel path measurements along a designated line is desirable because of the need for machine-controlled precision to increase the quality of data points taken which must be as accurate as possible in a micro-laser beam straight line. The rolling (FF/FL) measurement devices (single-axis) in the prior art are manually operated with human interference and the minimum amount of constant motorization or lack thereof they employ cannot accomplish this task of accuracy as can the present invention with regards to precise elevation data collection.

The present invention in its F-min configuration (dual-axis) cannot be made to emulate or duplicate the performance of any of the (FF/FL) machines, and none of the prior art (FF/FL) machines can be used to perform the process that the present invention automates.

The typical application of this invention is to measure the magnitude deviations away from zero planar infinity with regards to the absolute value of any given horizontal surface for a predefined vehicle path where surface levelness and flatness are critical to the performance of automated warehouse equipment using that path, and the like. Excessive magnitude deviations away from zero planar infinity will cause adverse behavior by such equipment specified to operate within critical tolerance conditions, including but not limited to causing collisions, spillage, undue stress on equipment, wear and tear on the floor system itself, and operator injury or death.

Floors so measured will be revisited using data (e.g. charts, graphs) generated by the proprietary software in the invention's computer system, so that surfaces can be analyzed and corrected by remedial measures.

This proprietary software produces charts that were developed by the inventor specifically to point out floor defects using the color red for the longitudinal profiles and blue for the transverse profiles. The charts were also specifically designed by the inventor to simultaneously plot and overlay each of the red and blue profiles together to assist with the visual positioning of chassis-mast attitude positioning.

SUMMARY OF THE INVENTION

The present invention solves the prior art problems discussed above and provides a distinct advance in the state of the art. The present invention uses a wheeled platform with laser-detector guidance tracking system to roll along a floor path designated by the user. The present invention measures and emulates vehicle chassis-mast performance, floor surface elevations, crosswise tilt, and lengthwise tilt of the wheelbase configuration simultaneously, semi-continuously as directed by a computer system, and all of these data are used to compute mast sway (static-lean).

The computer can be a laptop computer, supplemented with a wireless handheld device, such as a PDA or smartphone. The apparatus provides real-time data for immediate remedial activity in specific vehicle path wheel locations if desirable via LCD screens for a visual and physically in the form of laser etching on the floor. The laser-etcher houses a high intensity class III laser, or the like, which can burn symbols or characters into the floor's surface for future reference if out-of-tolerance elevations are detected and in need of corrective measures.

The preferred embodiment of the present invention includes a controller for operating a drive mechanism and motor that propels the measuring apparatus, and a plurality of sensors operated by the controller to measure longitudinal and transverse chassis angles of a given vehicle. In the preferred embodiment, the invention measures floor surface elevations that will be seen by a vehicle via measuring floor height with respect to the measuring apparatus in selectable increments along the surface of the floor. In another embodiment of the invention, the measuring apparatus emulates crosswise and lengthwise tilt along the length and width of a vehicles wheel base on the floor only where the emulated vehicle's wheels will touch in selectable increments.

DETAILED DESCRIPTION

Figure 1:
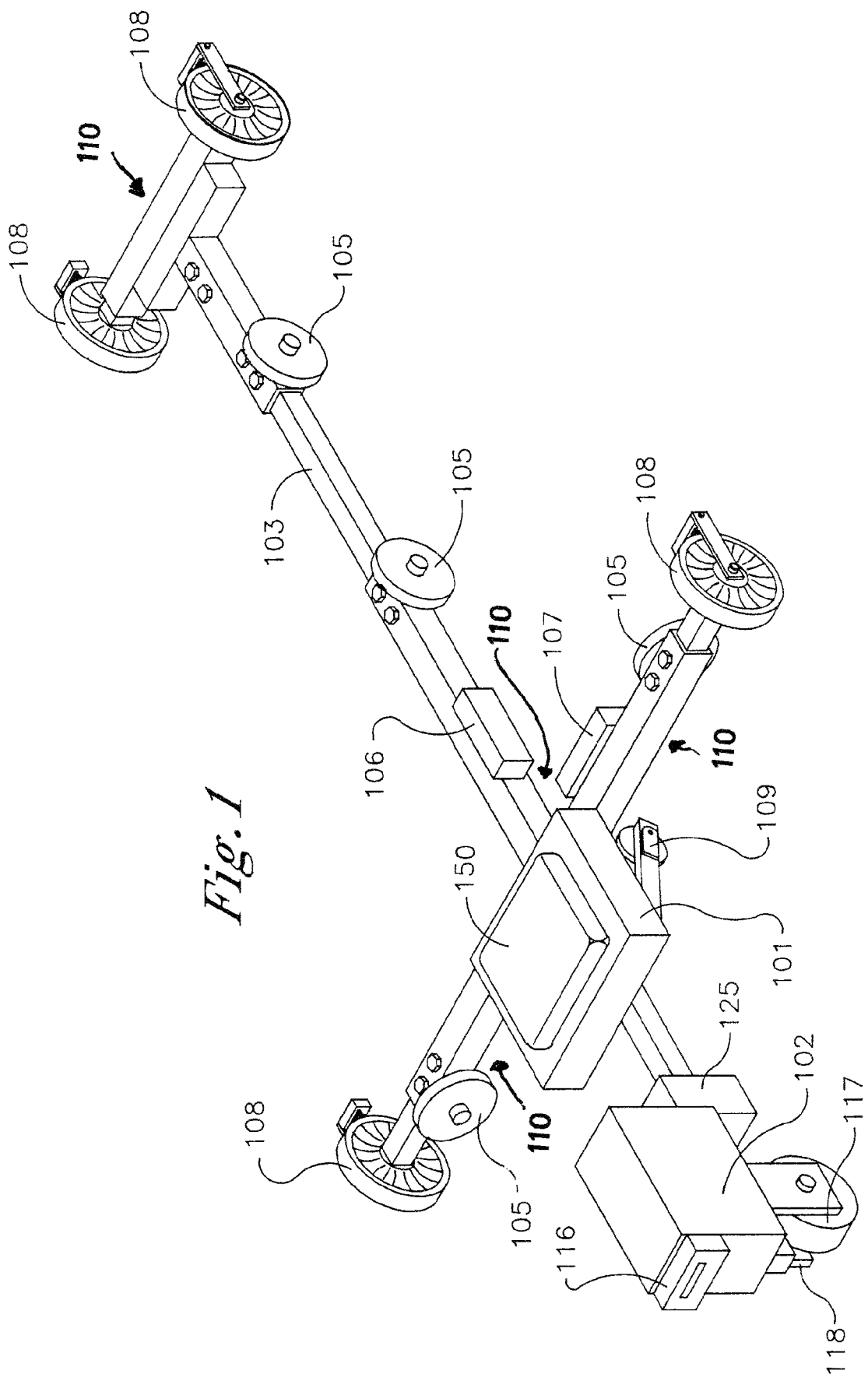
FIG. 1 is a perspective view of the vehicle emulator

A preferred embodiment of the vehicle chassis emulator apparatus of the present invention, referred to as a vehicle emulator 100, is displayed in FIG. 1. The vehicle emulator 100 includes an electronics housing 101, drive wheel housing 102, longitudinal boom 103, transverse boom 104, a plurality of boom adjustment means 105, a longitudinal sensor 106, a transverse sensor 107, a plurality of boom wheels 108, a distance encoder wheel 109, a drive wheel 117, and laser-beam etcher 110 for marking numerical elevations (not shown directly in the figure). A wireless PDA, or smartphone device 150 communicates to the vehicle emulator 100 during the vehicle emulation exercise via infrared, RF, or the like.

Figure 3:
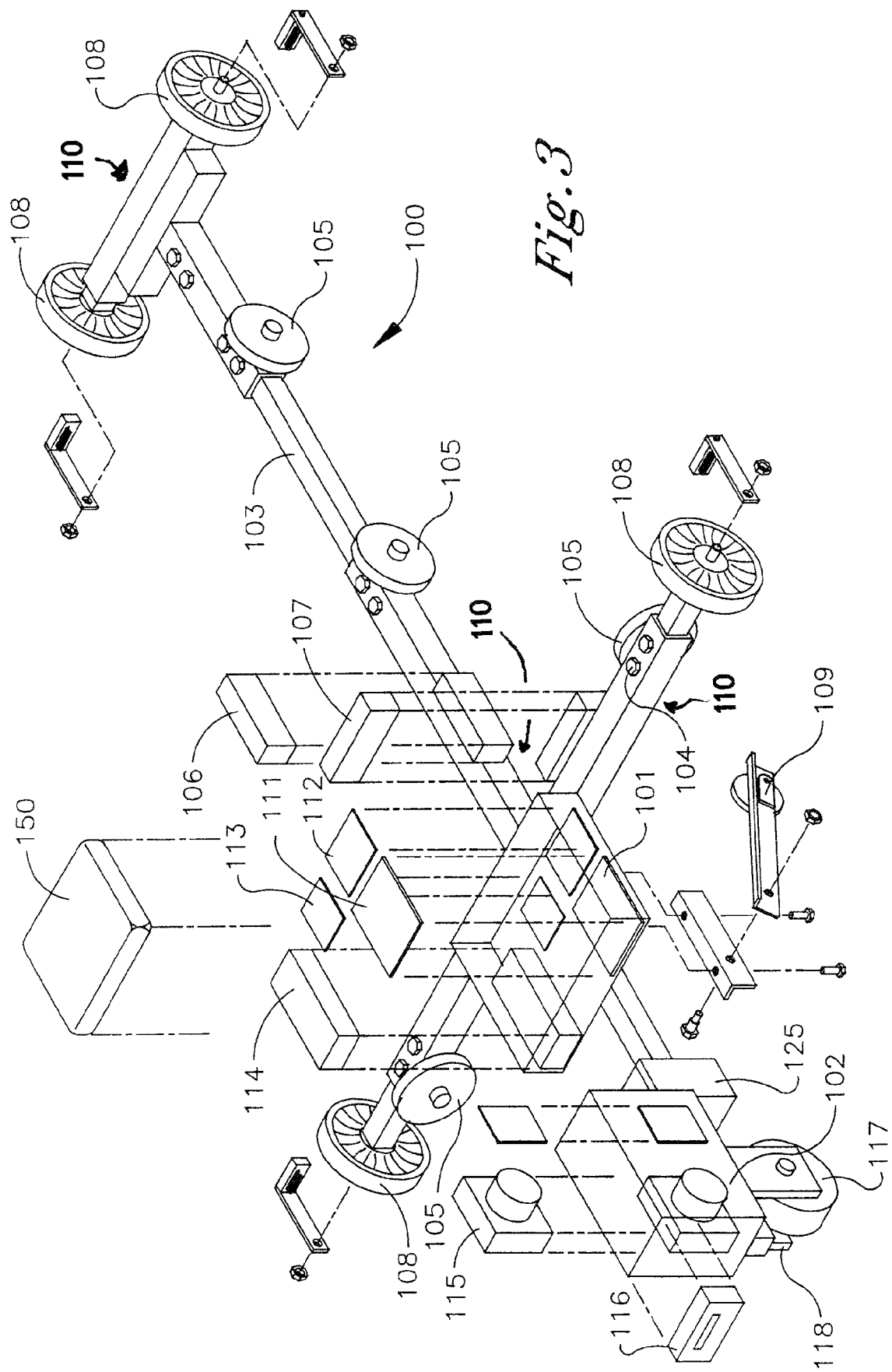
FIG. 3 is an exploded view of the vehicle emulator

FIG. 3 shows the vehicle emulator 100 in an exploded view. As shown, within the electronics housing 101 are several subassemblies. The subassemblies are comprised of a profiler control circuit board 111, a signal conditioner circuit board 112, a circuit board control system module for the laser etcher 113, and a battery charger 114.

The drive wheel housing 102 has within it a drive motor 115 and a steering servo 125 for the drive steering 117, which is electronically connected to the emulator's guidance circuit board 118. The laser-beam etchers 110 are attached directly to the framework in locations particular to the current emulation configuration and they are activated by the circuit board control system module 113.

Figure 2:
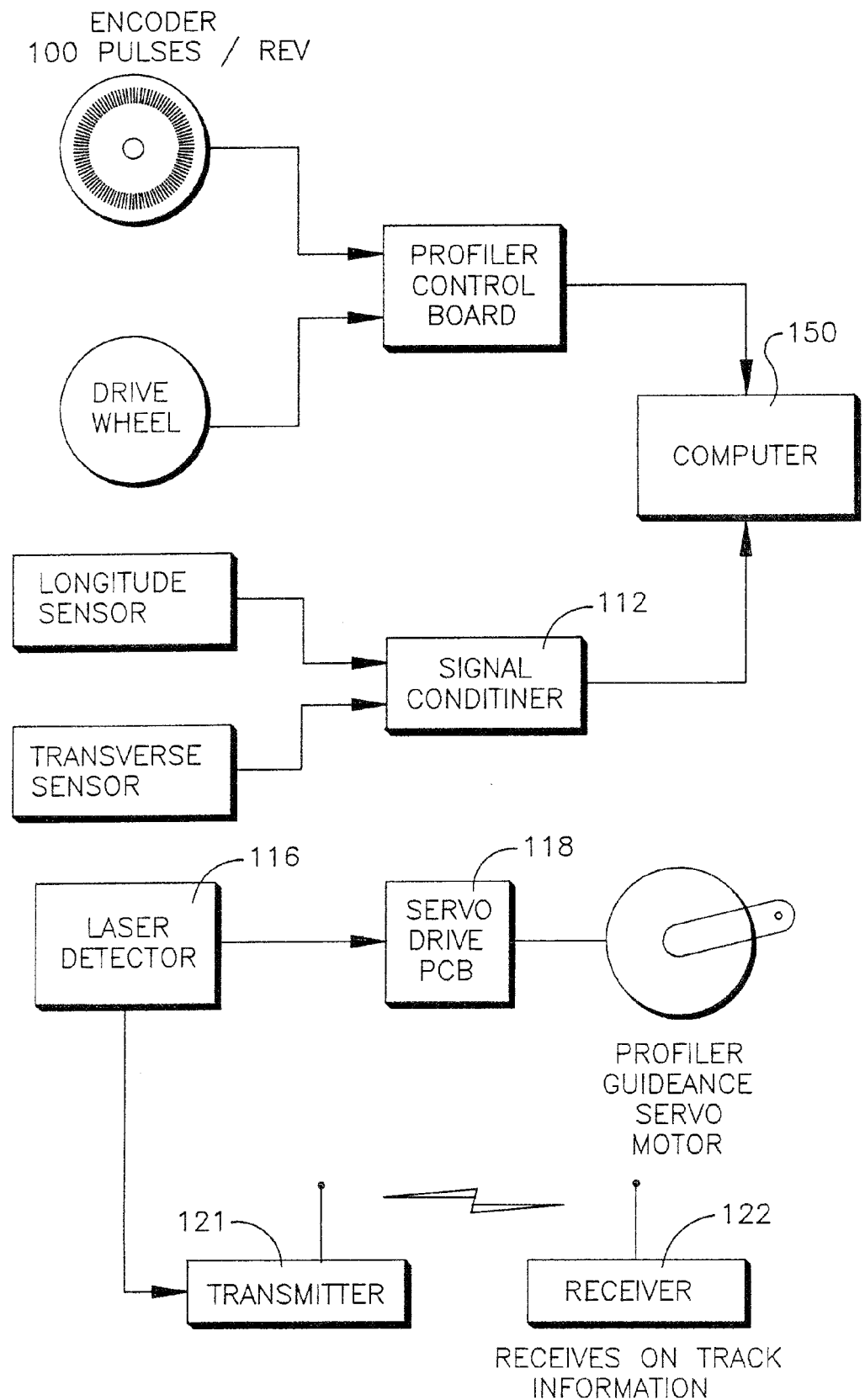
FIG. 2 is an overview block diagram of the control and data processing systems of the profiler

Referring to FIG. 2, the profiler guidance circuit board 118 controls the laser guidance feature of the preferred embodiment, receiving inputs from the laser detector 116 and sending commands to the emulator guidance 118 and the profiler guidance servo motor 125.

The longitudinal sensor 106 and the transverse sensor 107 send outputs to an on-board signal conditioner 112, which can be connected to the computer 150 via an RS-232 serial/parallel port, USB cable, infrared, RF or similar wireless device. The signal conditioner 112 communicates with the computer 150 to inform the algorithms running on the computer 150 of the status of the vehicle emulation exercise. The wheelbase of the vehicle emulator 100 can be adjusted to meet the important parameters of the exercise.

The RS-232 serial/parallel port, USB cable, infrared, RF or similar wireless device can communicate with the vehicle emulator control unit which processes distance data from the digital encoder 109 for start and stop of the drive motor 115. Emulation distance is preset in the input parameters in the algorithms within the computer 150.

The sensors 106, 107 are sensitive to any movement. Therefore, the vehicle emulator 100 is stopped and stabilized before any readings are taken and stored in the computer 150. This ensures that no accelerations or decelerations are recorded which would otherwise cause erroneous readings and corrupt the output data elevations. The vehicle emulator 100 can be programmed to take all readings on-the-fly with a reduction in measurement accuracy.

The vehicle emulator 100 is primarily an angle measurement device. Measurements are the difference between two points crosswise and three or four points longitudinally. Readings are taken at intervals (distances entered into the computer 150) while the emulator 100 has stabilized for accurate readings.

After storing the angle measurements, the profiler 100 automatically moves the preset distance and takes the next angle measurement along with the distance between readings, using the distance encoder 109.

Typically, using the preferred embodiment, the vehicle emulator 100 is tasked to emulate the aisle profiles that a warehouse forklift truck will see as ride-ability. The floor levelness and flatness of the aisles between the tall warehouse shelves directly impacts the ability of the truck to operate without causing collisions with the shelves at the top levels as well as impacting the performance of the mechanical systems at all levels within the vehicle. That is, a small floor displacement (too high or too low) on one wheel of the truck results in an angular displacement from vertical for the trucks lifting mast.

For a tall enough mast and narrow enough aisles, this can result on the top of the mast colliding with the shelves. In addition, on lower levels, motors, bearings, and seals can be damaged.

The preferred embodiment of the present invention can emulate the track of the forklift truck by adjustment of the wheelbase of the vehicle emulator 100. There are a plurality of truck wheel profiles that can be emulated with the preferred embodiment.

The transverse boom 104 and longitudinal boom 103 can be adjusted with the boom adjustment means 105 to emulate the three or four wheels of the standard wheel trucks that are used in modern material handling warehouses. The vehicle emulator 100 will be run down the project floor path between the future or existing racking following the in the footprint of the wheels of the future or existing lift truck and the invention records the deviation magnitude away from zero planar infinity. It will simultaneously laser etch out-of-tolerance elevations on the floor with laser-beam etchers 110 at the points where the deviations from specified levelness and flatness are sensed.

The computer 150 can be implemented with a laptop computer, wireless PDA, or smartphone device. In the preferred embodiment, the computer 150 is a laptop computer.

Input parameters entered into the computer 150 include maximum tolerated deviation from levelness and flatness, width of wheelbase, length of wheelbase, step size between measurements, and length of run. The laser guidance circuit board 111 will control the steering servo 115 to adjust the drive wheel 117 to steer the vehicle emulator 100 down the center of the warehouse aisle path. In the preferred embodiment, the laser detector 116 is a set of photodiodes placed in a horizontal array that measures deviation from the center point (null) for the laser pulse.

The vehicle emulator 100 is actually an autonomous robot once it has been activated by commands from the computer 150, input by the user. The computer 150 continuously records the sensors 106, 107 and collects data via the sensor circuit board 112, and if necessary, activates the laser beam etchers 110 for out-of-tolerance anomalies.

The computer 150 orders the vehicle emulator 100 to move from point to point by means of commands to the drive motor/transmission 115. The run can be interrupted (paused) by means of wireless or physical commands entered via the computer 150 or on the emulator 100 unit itself, and then restarted in the same manner. The laser guidance circuit board 111 only directs the angle at which the drive wheel 117 operates, thereby automatically steering the vehicle emulator 100 down the aisle in a straight line.

In FIG. 2, the transmitter 121 sends a "beep" tone to a remote receiver 122 when the laser detector senses that the laser beam is centered on the null. An operator can leave the autonomous emulator 100 once it has been started, and will be warned remotely by the receiver 122 if the unit goes off course by the cessation of the beep tone.

Although the invention has been described and a preferred embodiment has been provided, equivalent features may be employed and substitutions made within this specification without departing from the scope of the invention as recited in the claims.

What is claimed is:

1. a vehicle mast angle emulator, the emulator comprised of a longitudinal boom, a short transverse boom, and a long transverse boom, the short transverse boom placed orthogonally at one end of the longitudinal boom, the long transverse boom placed orthogonally at the other end of the longitudinal boom, the short and long transverse booms each terminating in wheels, the long transverse boom possessing a transverse sensor, the long transverse boom also possessing a plurality of laser-etching devices, the longitudinal boom possessing a drive wheel housing at one end, an electronics housing on top, a computer system within the electronics housing, longitudinal sensors, and a distance encoder wheel, the drive wheel housing possessing a drive wheel, a drive motor, and a steering servo, the drive wheel housing having attached to it a guidance system, the guidance system comprised of a beam emitter and a beam sensor, the electronics housing containing an emulator control circuit board, a signal conditioner circuit board, a laser-etching computer, and a battery charger, the longitudinal boom and short and long transverse booms also each possessing a plurality of boom adjustment means, the short and long transverse booms adjustable to match the wheelbase width of material handling trucks, the laser etching computer possessing software that accepts inputs from the distance encoder wheel and the longitudinal sensors, the laser etching computer capable of computing with said software floor deviation magnitude away from planar infinity and directing the laser etching devices to mark the floor where the computer senses floor flatness deviation, the laser etching computer possessing sufficient on-board computer memory to store a complete record of the traverse by the emulator of a warehouse corridor.

* * * * *